United States Patent
Yoshida et al.

(10) Patent No.: US 11,554,498 B2
(45) Date of Patent: Jan. 17, 2023

(54) WAFER JIG, ROBOT SYSTEM, COMMUNICATION METHOD, AND ROBOT TEACHING METHOD

(71) Applicants: KAWASAKI JUKOGYO KABUSHIKI KAISHA, Kobe (JP); Kawasaki Robotics (USA), INC., Wixom, MI (US)

(72) Inventors: Masaya Yoshida, Himeji (JP); Hajime Nakahara, San Jose, CA (US)

(73) Assignees: KAWASAKI JUKOGYO KABUSHIKI KAISHA, Kobe (JP); Kawasaki Robotics (USA), INC., Wixom, MI (US)

(*) Notice: Subject to any disclaimer, the term of this patent is extended or adjusted under 35 U.S.C. 154(b) by 113 days.

(21) Appl. No.: 17/067,423

(22) Filed: Oct. 9, 2020

(65) Prior Publication Data
US 2022/0111534 A1    Apr. 14, 2022

(51) Int. Cl.
*B25J 11/00* (2006.01)
*B25J 15/00* (2006.01)
*B25J 9/16* (2006.01)
*B25J 13/08* (2006.01)

(52) U.S. Cl.
CPC .......... *B25J 11/0095* (2013.01); *B25J 9/1612* (2013.01); *B25J 13/087* (2013.01); *B25J 15/0014* (2013.01)

(58) Field of Classification Search
CPC .... B25J 11/0095; B25J 9/1612; B25J 13/087; B25J 15/0014
See application file for complete search history.

(56) References Cited

U.S. PATENT DOCUMENTS

| | | | |
|---|---|---|---|
| 8,688,261 B2* | 4/2014 | Hirota | H01L 21/68707 700/214 |
| 2006/0192514 A1* | 8/2006 | Adachi | H01L 21/681 318/568.13 |
| 2016/0055425 A1* | 2/2016 | Minami | G05B 19/425 706/12 |
| 2016/0158935 A1* | 6/2016 | Inomata | B25J 9/0081 700/214 |

FOREIGN PATENT DOCUMENTS

| | | | | |
|---|---|---|---|---|
| EP | 1911552 A1 | * | 4/2008 | ....... H01L 21/67742 |
| JP | 2003165078 A | * | 6/2003 | |
| JP | 2005123261 A | * | 5/2005 | ....... H01L 21/68707 |
| JP | 2005142225 A | * | 6/2005 | |
| JP | 2005310858 A | * | 11/2005 | |
| JP | 2010-137300 A | | 6/2010 | |
| WO | WO-03022534 A1 | * | 3/2003 | ....... H01L 21/67259 |

* cited by examiner

*Primary Examiner* — Kaitlin S Joerger
(74) *Attorney, Agent, or Firm* — Metrolex IP Law Group, PLLC (57) ABSTRACT

A wafer jig according to an embodiment may be used for a robot having a hand including a light emitting part and a light receiving part. The light receiving part detects detection light emitted from the light emitting part. The wafer jig includes a light source for emitting the notification light toward the light receiving part. The wafer jig outputs information to a hand side by emitting the notification light from the light source to the light receiving part.

21 Claims, 6 Drawing Sheets

First embodiment

First embodiment

Second embodiment

Fig.7

Third embodiment

WAFER JIG, ROBOT SYSTEM, COMMUNICATION METHOD, AND ROBOT TEACHING METHOD

TECHNICAL FIELD

The present invention relates to an use of a jig for a robot that handles a wafer.

BACKGROUND ART

Conventionally, a robot system for automatically teaching a conveying position of a semiconductor wafer to a robot arranged in a clean room where the semiconductor wafer (semiconductor substrate) is manufactured, the robot conveying the semiconductor wafer, has been known. The patent document 1 discloses a manipulator of this type of substrate transfer.

Patent Literature 1 (Japanese Patent Application Laid-Open No. 2010-137300, hereinafter, PTL 1) discloses this kind of a substrate transport manipulator. The substrate transport manipulator of PTL 1 includes a hand capable of holding a teaching jig and an arm portion for supporting the hand. In the substrate transport manipulator, a teaching jig transmission cable derived from the teaching jig is connected to a connector connection portion provided at the base end portion of the hand and introduced into the arm to be connected to a controller.

In the configuration of PTL 1, a posture of the teaching jig transmission cable is constantly maintained during the teaching. PTL 1 discloses that this can avoid a problem of damage of the jig or a peripheral device by the cable catching in the device.

SUMMARY OF THE INVENTION

Problems to be Solved by the Invention

In the configuration of PTL 1, in order to transmit an electrical signal, an electrical cable for connecting between the jig and the robot controller is required. Therefore, it is difficult to miniaturize the jig. The configuration that requires the electrical cable is not suitable for, for example, applications handing semiconductors having a low resistivity to generation of dust.

The present invention has been made in view of the circumstances described above, an object of the present invention is to provide a wafer jig that does not require a communication cable to communicate with a robot and a robot system that uses the wafer jig.

Means for Solving the Problems and Effects Thereof

Problems to be solved by the present invention are as described above, and next, means for solving the problems and effects thereof will be described.

According to a first aspect of the present invention, a wafer jig with the following configuration is provided. That is, the wafer jig is used for a robot having a hand including a light emitting part and a light receiving part for detecting detection light emitted from the light emitting part. The wafer jig includes a light source emitting notification light toward the light receiving part. The wafer jig outputs information to a hand side by emitting notification light from the light source to the light receiving part.

According to a second aspect of the present invention, a wafer jig with the following configuration is provided. That is, the wafer jig is used for a robot having a hand including a light emitting part and a light receiving part for detecting detection light emitted from the light emitting part. The wafer jig includes a jig light receiving part capable of detecting light emitted from the light emitting part of the hand.

According to a third aspect of the present invention, a wafer jig with the following configuration is provided. That is, the wafer jig is used for a robot having a hand including a light emitting part and a light receiving part for detecting detection light emitted from the light emitting part. The wafer jig includes a switching part capable of switching between a state in which the light receiving part receives the detection light from the light emitting part and a state in which the light receiving part does not receive the detection light. The wafer jig outputs information to the hand side by a switching of the switching part.

According to a fourth aspect of the present invention, the following communication method is provided. That is, in the communication method, between a robot and a wafer jig, the wafer jig transmits information to a hand side. The robot has a hand including a light emitting part and a light receiving part. The light receiving part detects detection light emitted from the light emitting part. The wafer jig can be held by the hand. The communication method includes a first step and a second step. In the first step, a state of keeping the wafer jig held by the hand is provided. In the second step, a light source included in the wafer jig emits notification light corresponding to the information toward the light receiving part.

Accordingly, the wafer jig can communicate with the robot (thus, the control part for controlling the robot) by using a part of the configurations included in the robot (the light emitting part and the light receiving part). Since the communication cable is not required, it is possible to realize miniaturization, simplification, and weight reduction of the wafer jig, and it is possible to suitably maintain flexibility of the movement of the robot.

Effects of Invention

According to the present invention, a wafer jig that does not require a communication cable to communication with the robot and a robot system that uses the wafer jig can be provided.

EMBODIMENT FOR CARRYING OUT THE INVENTION

Figure 1:
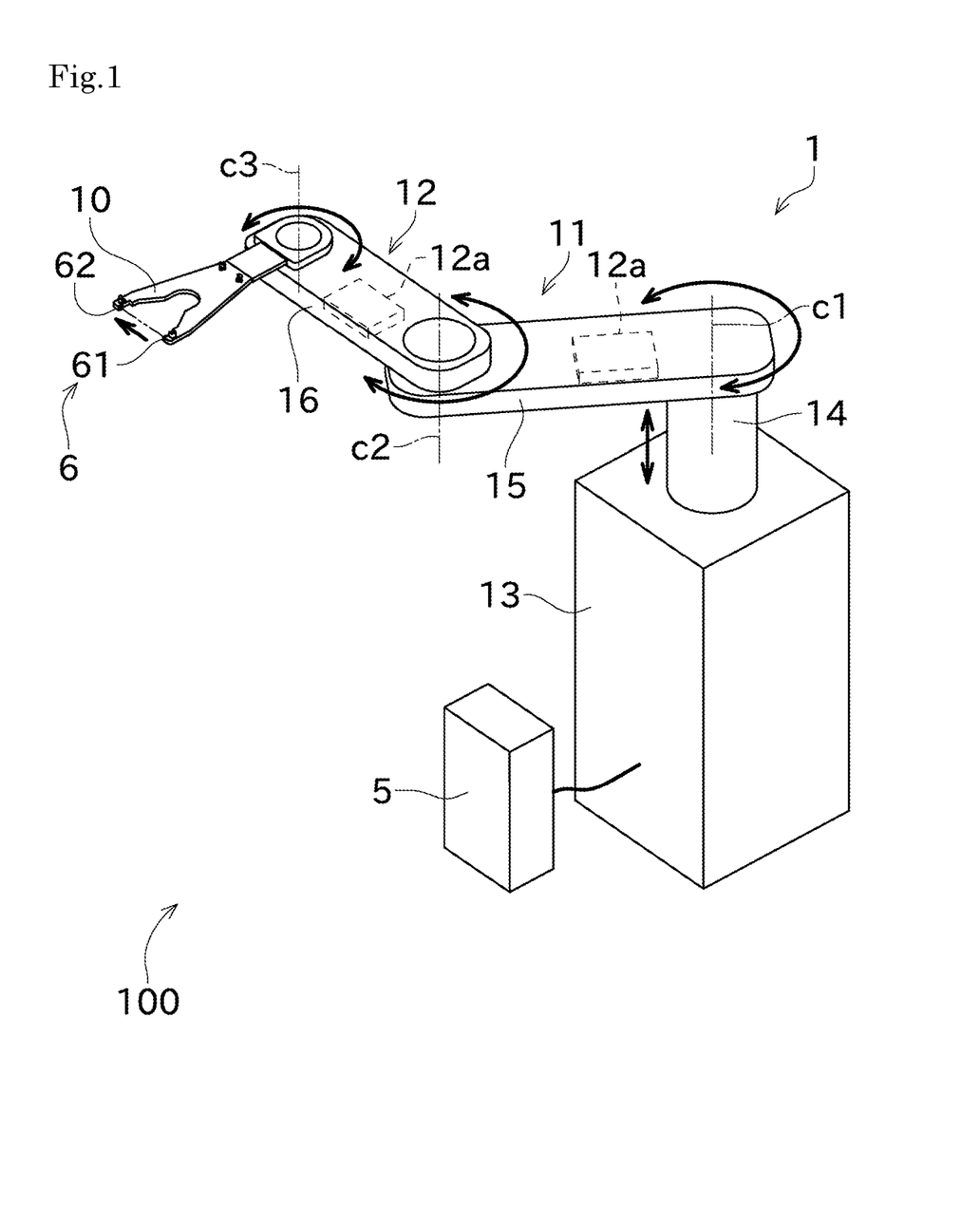
FIG. 1 is a perspective view showing a configuration of a robot system of the present invention.
Figure 2:
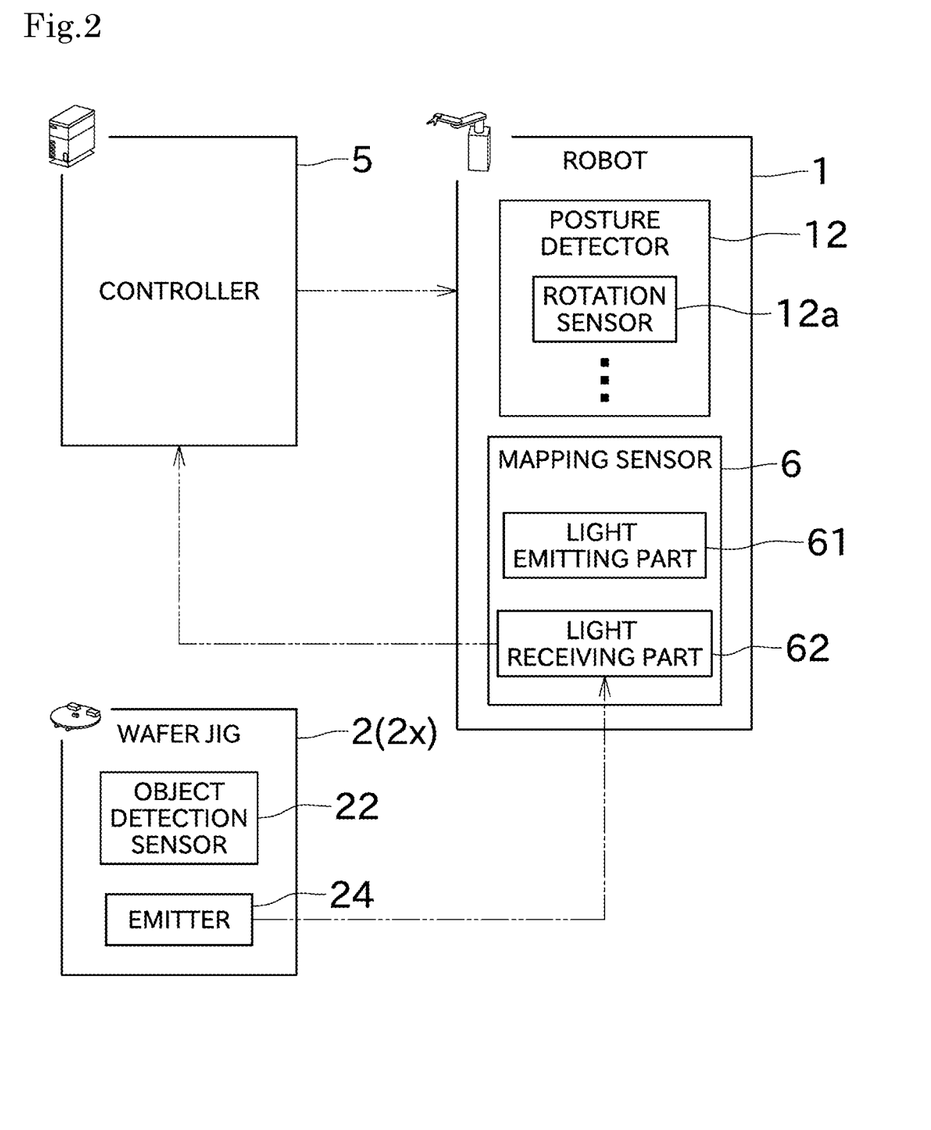
FIG. 2 is a block diagram showing a configuration of a part of a robot system.
Figure 3A:
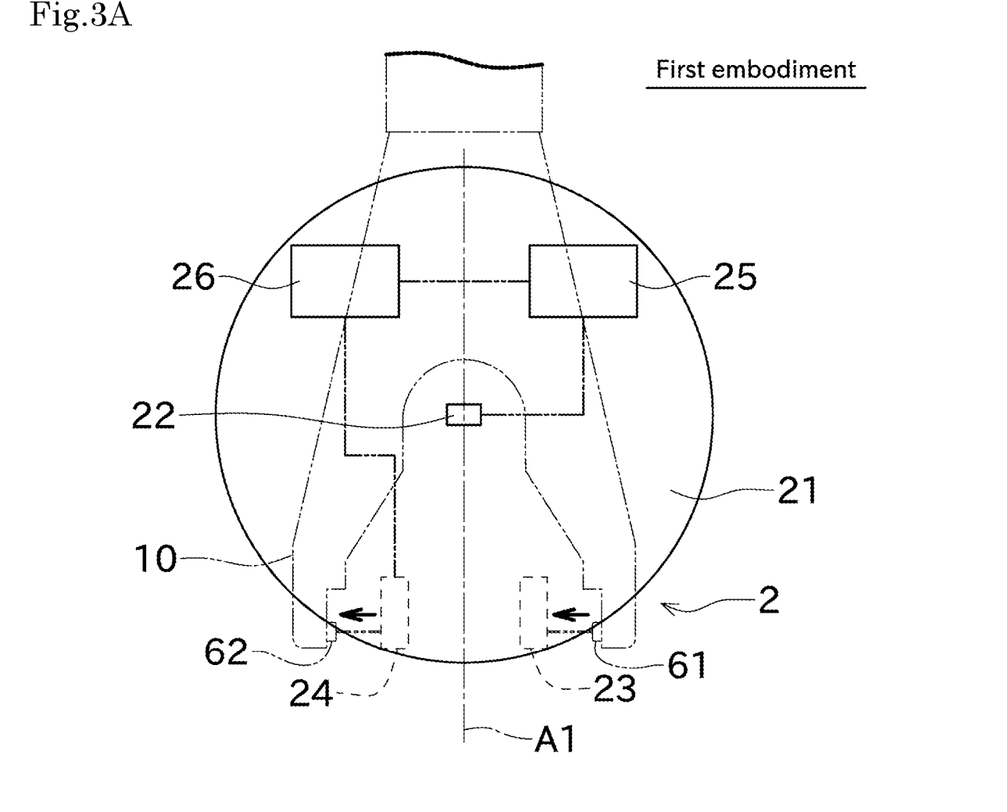
FIG. 3A is a plan view showing a configuration of a wafer jig of the first embodiment.
Figure 3B:
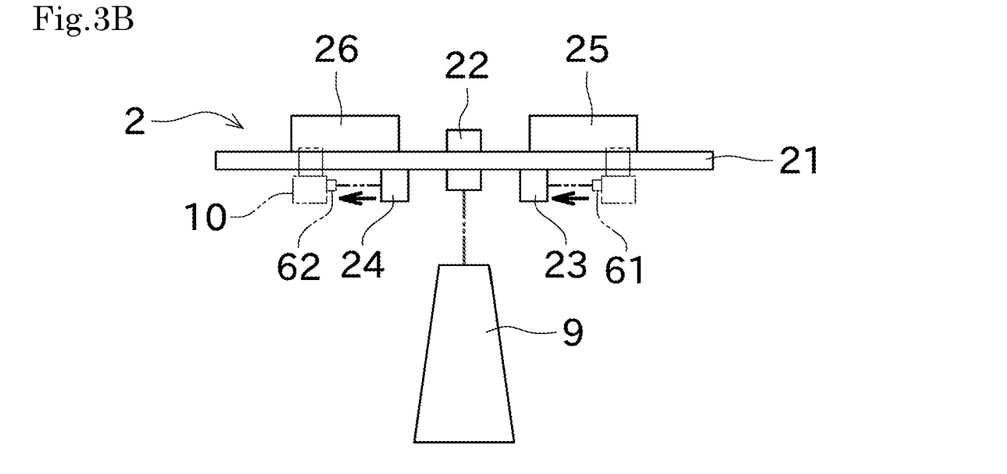
FIG. 3B is a side view showing a configuration of the wafer jig of the first embodiment.
Figure 4:
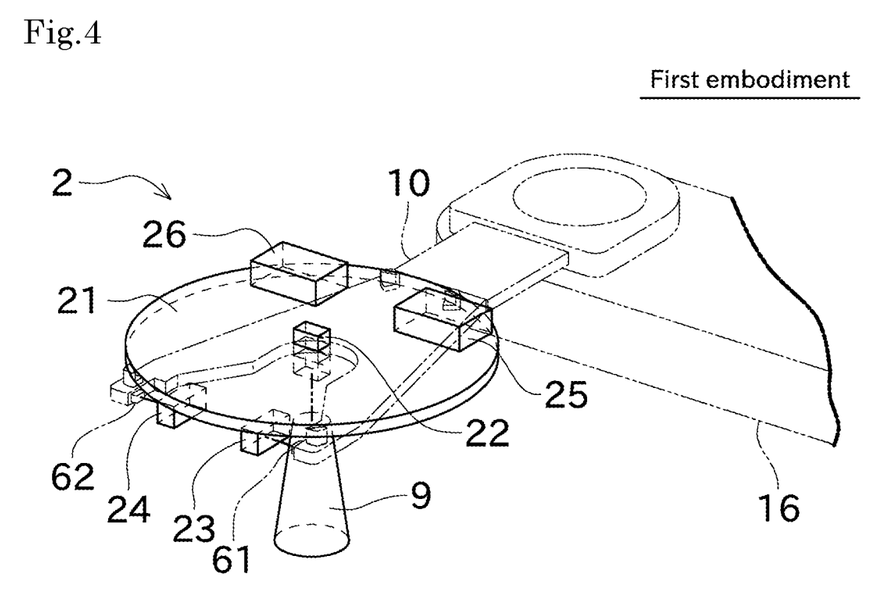
FIG. 4 is a partial perspective view showing a state of detecting the object by using the wafer jig of the first embodiment.

Next, an embodiment of the present invention will be described with reference to drawings. FIG. 1 is a perspective view showing a configuration of a robot system 100 of the present invention. FIG. 2 is a block diagram showing a configuration of a part of the robot system 100. FIG. 3A is a plan view showing a configuration of a wafer jig 2 of the first embodiment. FIG. 3B is a side view showing a configuration of the wafer jig 2 of the first embodiment. FIG. 4 is a partial perspective view showing a state of detecting the object 9 by using the wafer jig 2 of the first embodiment.

The robot system 100 shown in FIG. 1 is a system that allows the robot 1 to perform work in a work space such as a clean room. The robot system 100 can perform an automatic teaching in which the position of the robot 1 (specifically, the position of the hand 10 which will be described later), for example, is efficiently and accurately taught.

The robot system 100 includes the robot 1, a wafer jig (communication jig) 2, and a controller (control part) 5.

The robot 1 functions as a wafer transfer robot for conveying a wafer stored in a storage device (not shown), for example. In this embodiment, the robot 1 is achieved by a SCARA type horizontal articulated robot. SCARA is an abbreviation for Selective Compliance Assembly Robot Arm.

As shown in FIG. 1, the robot 1 includes a hand (end effector) 10, a manipulator 11, and a posture detector 12.

The hand 10, which is a kind of end effector, is generally formed in a V-shape or a U-shape in a plan view. The hand 10 is supported by a tip of the manipulator 11 (specifically, a second link 16 which will be described later). The hand 10 rotates around a third axis c3 extending in the vertical direction with respect to the second link 16.

In the robot 1 of this embodiment, as shown in FIG. 1, a mapping sensor (light sensor) 6 is provided at the tip side of the hand 10. The mapping sensor 6 can confirm (perform mapping) the presence or absence of an object (target) such as a wafer in a non-contact manner. In this embodiment, the mapping sensor 6 is composed of a transmission type sensor including a light emitting part 61 and a light receiving part 62, for example.

The light emitting part 61 and the light receiving part 62 are arranged side by side at an appropriate interval at a position biased to one side (the tip side of the hand 10) from the center of the hand 10 in a plan view. The center of the hand 10 refers to a position coincident with a center of a circular wafer in a plan view in a state where the hand 10 holds the wafer.

The light emitting part 61 emits detection light such as infrared light, for example, toward the light receiving part 62. The light receiving part 62 is connected to the controller 5 by wireless or wired. The light receiving part 62 outputs an electrical signal to the controller 5, the electrical signal indicating that the detection light is received or not.

If there is no object between the light emitting part 61 and the light receiving part 62, the light receiving part 62 outputs the electrical signal indicating that the detection light is received, since the detection light from the light emitting part 61 reaches the light receiving part 62. If there is an object between the light emitting part 61 and the light receiving part 62, the light receiving part 62 outputs the electrical signal indicating that the detection light is not received, since the detection light from the light emitting part 61 is blocked by the object.

The manipulator 11 mainly includes a base 13, a lifting shaft 14, and a plurality of links (a first link 15 and the second link 16).

The base 13 is fixed to the ground (for example, a floor of the clean room). The base 13 functions as a base member that supports the lifting shaft 14.

The lifting shaft 14 moves in the vertical direction with respect to the base 13. With such lifting, the heights of the first link 15, the second link 16, and the hand 10 can be changed.

The first link 15 is supported on top of the lifting shaft 14. The first link 15 rotates around a first axis c1 extending in the vertical direction with respect to the lifting shaft 14. Accordingly, a posture of the first link 15 can be changed within a horizontal plane.

The second link 16 is supported by a tip of the first link 15. The second link 16 rotates around a second axis c2 extending in the vertical direction with respect to the first link 15. Accordingly, a posture of the second link 16 can be changed within the horizontal plane.

The posture detector 12 includes a plurality of rotation sensors 12a. For example, an encoder constitutes the rotation sensors 12a. Each rotation sensor 12a detects a rotation position of each drive motor (not shown) that drives the hand 10, the first link 15, and the second link 16, respectively. Each rotation sensor 12a is electrically connected to the controller 5 and transmits the detected rotation position to the controller 5.

The wafer jig 2 is a jig that imitates the wafer. The wafer jig 2 is formed in a substantially disk shape as a whole. As shown in FIGS. 3A and 3B, the wafer jig 2 includes a main body 21, an object detection sensor 22, a blocker (blocking part) 23, and an emitter (light source) 24.

The main body 21 is formed in a circular flat plate shape. The diameter of the main body 21 is equal to the diameter of the wafer to be transferred by the robot 1. As long as the shape of the main body 21 substantially simulates the wafer, the material of the main body 21 need not be identical to the wafer.

The object detection sensor 22 is used to detect the object 9. The object detection sensor 22 is configured as a reflective sensor including a luminous part and a light receiving part, for example. The luminous part and the light receiving part of the object detection sensor 22 are provided at the lower portion of the main body 21 and at the center portion of the circular main body 21. The light axis of light emitted by the object detection sensor 22 is located at the central axis of the main body 21.

As shown in FIG. 4, the object 9 is formed in an elongated truncated cone shape, for example. The object 9 is arranged vertically at an appropriate location within the movable range of the hand 10. The surface of the upper end of the object 9 is formed to reflect light. A reflective sheet or the like may be attached to the upper surface of the object 9.

The blocker 23 is used to block the detection light emitted by the light emitting part 61. The blocker 23 is provided to project below the main body 21.

The emitter 24 is used to emit the detection light to the light receiving part 62. For example, the emitter 24 has the same configuration as the light emitting part 61 and emits notification light such as infrared light toward the light receiving part 62. The emitter 24 is provided to project below the main body 21.

The blocker 23 and the emitter 24 are arranged side by side at an appropriate interval at a position biased to one side from the center of the main body 21 in a plan view.

Specifically, as shown in FIGS. 3A and 3B, in a state where the wafer jig 2 is held by the hand 10, both of the blocker 23 and the emitter 24 are located at the light path of the detection light of the mapping sensor 6 (the light path from the light emitting part 61 to the light receiving part 62). In that situation, the blocker 23 is located closer to the light emitting part 61 in the light path, the emitter 24 is located closer to the light receiving part 62.

The blocker 23 blocks the detection light from the light emitting part 61 in a state of facing the light emitting part 61. The emitter 24 emits the notification light toward the light receiving part 62 in a state of facing the light receiving part 62.

In this embodiment, as shown in FIGS. 3A and 3B, in a state where the wafer jig 2 is held by the hand 10, the blocker 23 and the emitter 24 are provided symmetrically with the axis A1 which is parallel to the extending direction of the hand 10. However, the arrangement of the blocker 23 and the emitter 24 is not limited to the above.

As shown in FIGS. 3A and 3B, the wafer jig 2 of this embodiment includes an amplifier 25 and a battery 26.

The amplifier 25 is used to amplify a detection signal of the object detection sensor 22. The amplifier 25 is provided on the upper surface of the main body 21. The amplifier 25 is electrically connected to the object detection sensor 22 and the battery 26. The amplifier 25 operates with electrical power from battery 26 and amplifies the detection signal received from the object detection sensor 22. The voltage of the amplified detection signal is compared to a predetermined voltage by a comparator (not shown). The comparator outputs the comparison result as an operation signal to the battery 26.

The battery 26 provides power to the object detection sensor 22, the amplifier 25, the emitter 24, etc.

The battery 26 switches lighting-on/lighting-off of the emitter 24 according to the signal from the comparator. Therefore, the comparator substantially functions as a light source control part for controlling the emitter 24 to realize the communication method of the present invention.

The wafer jig 2 configured as described above can communicate with the controller 5 via a mapping sensor 6 provided in the hand 10. Details will be described later.

The controller 5 is configured as a known computer including a CPU, a ROM, a RAM, an auxiliary storage device, etc. The auxiliary storage device is configured as, for example, an HDD, an SSD, etc. The auxiliary storage device stores a robot control program, etc. for controlling the robot 1.

The controller 5 outputs a command value to each drive motor that drives each part of the above described robot 1 in accordance with a predetermined operation program, a movement command that is input from the user, or the like. The controller 5 controls to move the hand 10 to a predetermined command position.

Next, a robot teaching method will be described in detail. In the robot system 100 of this embodiment, the robot teaching method corrects the command position for the robot 1 based on the detection position of the hand 10 obtained from the detection result of the wafer jig 2 by the communication method of the present invention.

The wafer jig 2 is stored in an appropriate storage position when not in use. The robot 1 holds the wafer jig 2 stored in the storage position in response to a control command from the controller 5 (the first step). The robot 1 transfers the held wafer jig 2 to a predetermined position. After transfer, the object detection sensor 22 of the wafer jig 2 is located at the vicinity of the object 9.

Thereafter, the robot 1 scans the object 9 by the object detection sensor 22 while moving the hand 10 together with the wafer jig 2 in various directions within a suitable range in a plan view. In this embodiment, the shape of the upper surface of the object 9 is circular. Therefore, the center of the circle can be specified by detecting the position of at least three points of the circle by using the object detection sensor 22. In this embodiment, in the plan view, the center of the circle of the upper surface of the object 9 is a reference position for position correction which will be described later.

In the course of the scanning, in the wafer jig 2, the emitter 24 is lighting-on while the object 9 is detected by the object detection sensor 22 and the emitter 24 is lighting-off while the object 9 is not detected by the object detection sensor 22 (second step). The notification light of the emitter 24 can be detected by the light receiving part 62 of the hand 10 side. The light receiving part 62 outputs an electrical signal to the controller 5, the electrical signal indicating that the notification light is received or not. This enable the controller 5 to recognize whether the object detection sensor 22 detects the object 9 or not through the light receiving part 62.

If the object detection sensor 22 detects the object 9, instead of lighting the emitter 24, the emitter 24 may be flashed at a predetermined frequency. In this case, the controller 5 can easily distinguish the notification light from the emitter 24 and the detection light from the light emitting part 61.

Due to the tolerance or the like of the robot 1, a displacement may occur between the position of the hand 10 commanded to the robot 1 and the actual position of the hand 10. According to this embodiment, the displacement can be specified based on the result of scanning the object 9 by the wafer jig 2, and the command position for the robot 1 can be corrected.

The following is a brief description about that. The controller 5 stores the command position for the robot 1 in advance corresponding to each of the three points which is acquired by the detection of the object 9 by using the object detection sensor 22. The controller 5 calculates the command position corresponding to the center of the circle passing through the three command positions in a known manner. If there is a displacement between the command position calculated in this way and the command position previously used for coinciding the center of the hand 10 with the center of the object 9, the controller 5 obtains the displacement amount by calculation. The displacement amount can be represented by a plane vector, for example. The controller 5 corrects the offset of the command position by subtracting the vector of the displacement amount from the original command position. The command position after correction given to the robot 1 by the controller 5 enable the robot 1 to improve the operation accuracy.

Since the wafer jig 2 is shaped like the wafer, the hand 10 can handle the wafer jig 2 in the same manner as an ordinary wafer. Therefore, it is easy to automatically perform a series of operations of the above described scanning and position correction.

The wafer jig 2 notifies the controller 5 via the mapping sensor 6 (specifically the light receiving part 62) that the object 9 is detected by the object detection sensor 22. In this way, since information is transmitted by optical communication, electrical cables is not required. Accordingly, it is possible to realize simplification and weight reduction of the configuration. Since the electrical cable is not required, it is possible to suppress generation of dust. Furthermore, since the configuration uses the mapping sensor 6 which robots often includes conventionally, it is easy to apply to the existing robots.

As described above, the wafer jig 2 of this embodiment is used for robot 1 having the hand 10 including the light emitting part 61 and the light receiving part 62. The wafer jig 2 includes the emitter 24 for emitting the notification light toward the light receiving part 62. The wafer jig 2 outputs information to the hand 10 side by emitting the notification light from the emitter to the light receiving part 62.

Accordingly, the wafer jig 2 can communicate with the robot 1 by using a part of the configuration included in the robot 1 (the light emitting part 61 and the light receiving part 62). Since the communication cable is not required, it is possible to realize miniaturization, simplification, and weight reduction of the wafer jig 2, and it is possible to suitably maintain flexibility of the movement of the robot 1.

The wafer jig 2 of this embodiment includes the blocker 23. The blocker 23 blocks the light path between the light emitting part 61 and the light receiving part 62 when the wafer jig 2 is held by the hand 10.

Accordingly, when using the wafer jig 2, it is possible to prevent the light receiving part 62 from receiving the detection light from the light emitting part 61.

The wafer jig 2 of this embodiment includes the object detection sensor 22 for detecting the object 9. The emitter 24 of the wafer jig 2 outputs information whether the object detection sensor 22 detects the object 9 or not.

Accordingly, the detection result whether the object 9 is detected at the wafer jig 2 side is recognized at the robot 1 side.

In this embodiment, the object detection sensor 22 is provided at the center of the wafer jig 2.

Accordingly, since the object 9 is detected based on the position corresponding to the center of the wafer jig 2, it is possible to accurately grasp the position of the wafer jig 2 detected the object 9.

In this embodiment, in a state where the wafer jig 2 is held by the hand 10, the object detection sensor 22 is located at the center of the hand 10.

Accordingly, it is possible to obtain a detection result at the center position of the hand 10. The center position of the hand 10 is often used as a reference for position control. Therefore, for example, by using the detection result for position control, it is possible to improve the operation accuracy of the robot 1.

In the wafer jig 2 of this embodiment, lighting-on/lighting-off of the emitter 24 represents the information whether the object detection sensor 22 detects the object 9 or not.

Accordingly, it is possible to transmit information from the wafer jig 2 side with a simple configuration.

Figure 5A:
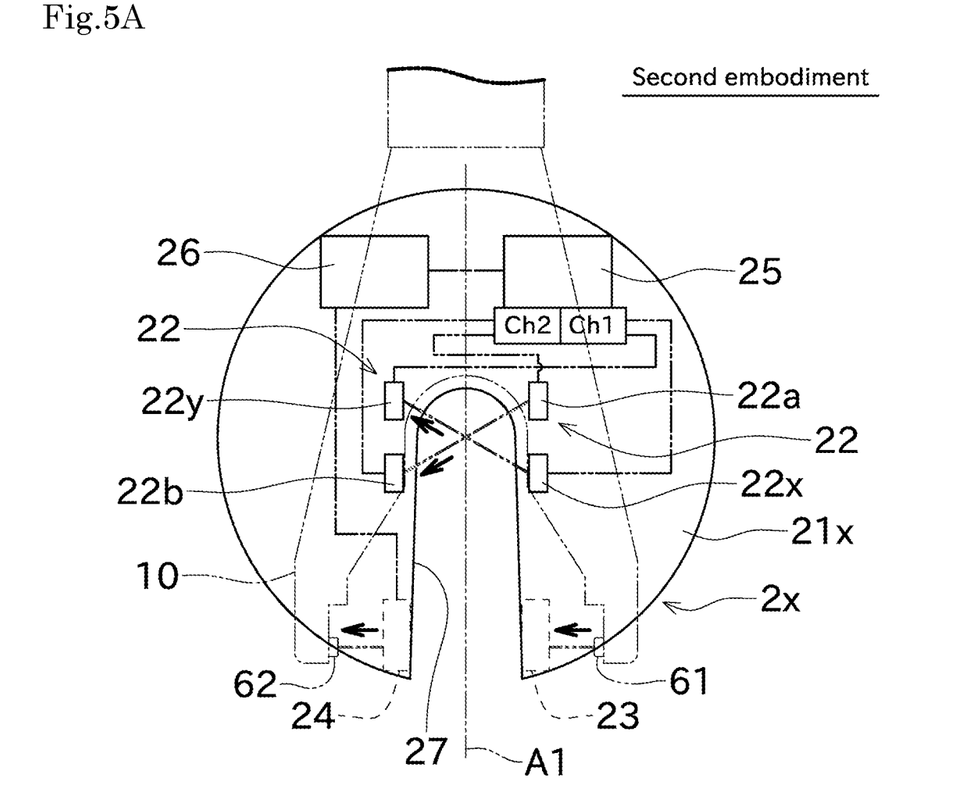
FIG. 5A is a plan view showing a configuration of a wafer jig of the second embodiment.
Figure 5B:
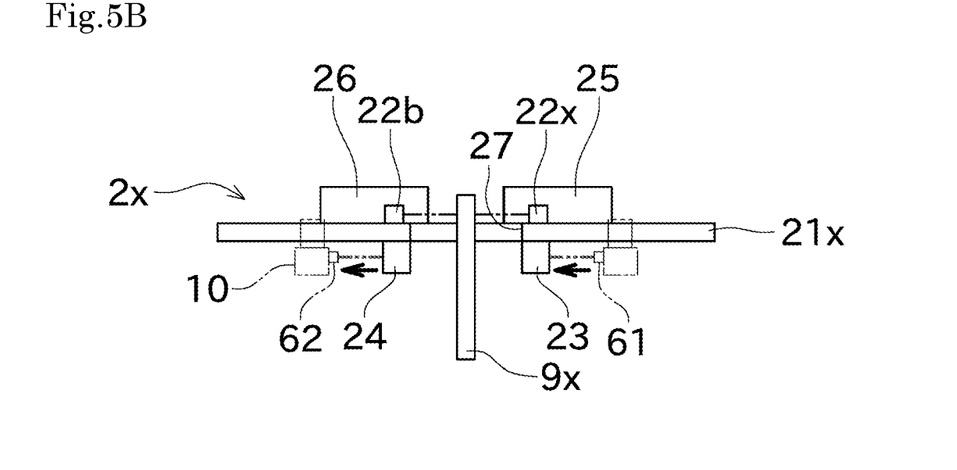
FIG. 5B is a side view showing a configuration of the wafer jig of the second embodiment.
Figure 6:
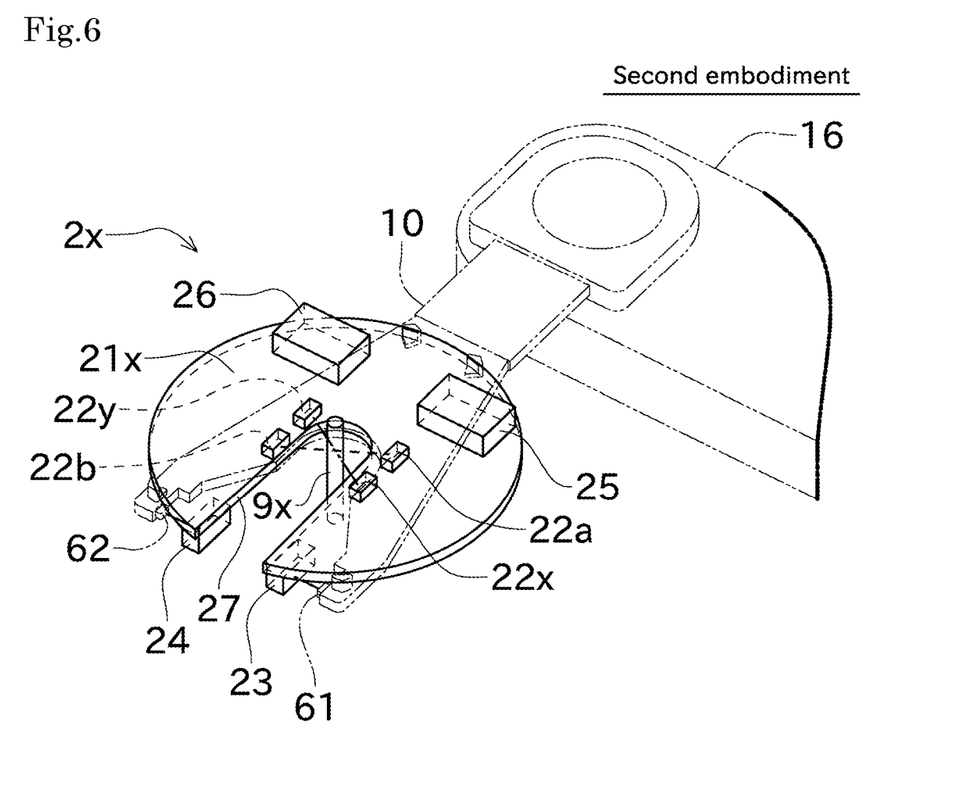
FIG. 6 is a partial perspective view showing a state of detecting the object by using the wafer jig of the second embodiment.

Next, the second embodiment will be described. FIG. 5A is a plan view showing the configuration of the wafer jig $2x$ of the second embodiment. FIG. 5B is a side view showing a configuration of the wafer jig $2x$ of the second embodiment. FIG. 6 is a partial perspective view showing a state of detecting the object $9x$ by using the wafer jig $2x$ of the second embodiment. In the description of this embodiment, members identical or similar to those of the above described embodiment may not be described and instead the same reference signs as in the above described embodiment are given on the drawings.

In the wafer jig $2x$ of this embodiment, as shown in FIG. 5A, a slit part 27 is formed on the main body $21x$. The slit part 27, when holding the wafer jig $2x$ by the hand 10, is formed so as to open toward the tip side from the center portion of the main body $21x$ along the longitudinal direction of the hand 10. The slit part 27 penetrates the body $21x$ in the thickness direction of the main body $21x$.

The wafer jig $2x$ of this embodiment includes two object detection sensors 22. Both of the two object detection sensors 22 are light sensors. The object detection sensor 22 is arranged so as not to interfere with the hand 10 in a state where the wafer jig $2x$ is held by the hand 10.

Each of the object detection sensors 22 includes a light emitting part and a light receiving part. In the following, each of the light emitting parts is described with reference signs $22x$ and $22a$ respectively, and each of the light receiving parts is described with reference signs $22y$ and $22b$ respectively. One of the two object detection sensors 22 is configured of the light emitting part $22x$ and the light receiving part $22y$, and the other of the two object detection sensors 22 is configured of the light emitting part $22a$ and the light receiving part $22b$.

Since the respective configurations of the light emitting parts $22x$, $22a$, and the respective configurations of the light receiving parts $22y$, $22b$ are the same as those of the light emitting part 61 and the light receiving part 62 provided in the mapping sensor 6 described above, description thereof will not be repeated.

The light receiving part $22y$ is arranged at the opposite side across the axis μl with reference to the light emitting part $22x$. The light receiving part $22b$ is arranged at the opposite side across the axis μl with reference to the light emitting part $22a$. The two object detection sensors 22 are arranged such that their light paths intersect in an X-shape in the plan view. The points at which the light paths intersect each other coincide with the center of the main body $21x$.

The amplifier 25 has two channels. The light receiving part $22y$ is electrically connected to the first channel Ch1 of the amplifier 25. The light receiving part $22b$ is electrically connected to the second channel Ch2 of the amplifier 25.

In this embodiment, as shown in FIG. 5B and FIG. 6, the object $9x$ is composed of a rod-shaped member capable of penetrating the slit part 27 of the main body $21x$, for example. The object $9x$ is formed in a round bar shape made of light-blocking materials.

In the wafer jig $2x$ of this embodiment, if the object $9x$ is not detected by the object detection sensors 22 in any of the first channel Ch1 and the second channel Ch2, the emitter 24 is controlled to be turned off.

If the object $9x$ is detected by the object detection sensor 22 of the first channel Ch1 and the object $9x$ is not detected by the object detection sensor 22 of the second channel Ch2, the emitter 24 is controlled to be flashed at a predetermined first frequency (e.g., 10 Hz).

If the object $9x$ is not detected by the object detection sensor 22 of the first channel Ch1 and the object $9x$ is detected by the object detection sensor 22 of the second channel Ch2, the emitter 24 is controlled to be flashed at a predetermined second frequency (e.g., 20 Hz).

If the object $9x$ is detected by the object detection sensor 22 of both the first channel Ch1 and the second channel Ch2, the emitter 24 is controlled to be flashed at a predetermined third frequency (e.g., 30 Hz).

As described above, in accordance with the combination of the detection results of the two object detection sensors 22, the flashing frequency of the emitter 24 is changed.

The wafer jig 2x includes a small computer (not shown) in order to perform the flash control for the emitter 24. The computer includes a CPU, a ROM, and a RAM, for example. The computer functions as a light source control part and transmits information to the controller 5 via the emitter 24.

In this embodiment, unlike the first embodiment described above, the detection results of the two object detection sensors 22 can be monitored simultaneously. Therefore, the center position of the object 9x can be identified by a simple operation of only moving the wafer jig 2 (hand 10) once in a straight line, for example. Therefore, the position correction can be completed in a short time.

As described above, in the wafer jig 2x of this embodiment, the frequency of repeating of lighting-on/lighting-off of the emitter 24 represents the information.

Accordingly, a variety of information can transmit from the wafer jig 2x to the controller 5.

The wafer jig 2 of this embodiment includes a plurality of object detection sensors 22. The frequency of repeating of lighting-on/lighting-off of the emitter 24 varies according to the combination of the detection results of the respective object detection sensors 22.

Accordingly, the detection results of the plurality of object detection sensors 22 can be transmitted to the controller 5 with a simple configuration.

The wafer jig 2x of this embodiment includes two object detection sensors 22. When viewed in the thickness direction of the wafer jig 2x, the light axis of the two object detection sensors 22 are intersected. In a state where the wafer jig 2 is held by the hand 10, the intersection portion of the light axes is located at the center of the hand 10 when viewed in the thickness direction of the wafer jig 2.

Accordingly, by detecting the object 9x with the two object detection sensors 22, the positional relation between the center position of the hand 10 and the object 9x can identify easily.

Figure 7:
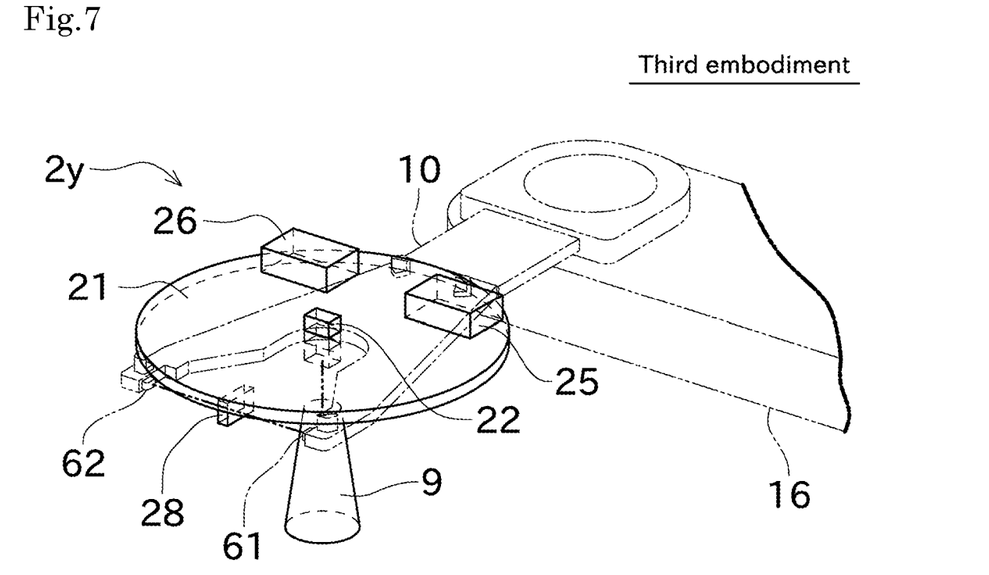
FIG. 7 is a partial perspective view showing a state of detecting the object by using the wafer jig of the third embodiment.

Next, the third embodiment will be described. FIG. 7 is a partial perspective view showing a state of detecting the object 9 by using the wafer jig 2y of the third embodiment. In the description of this embodiment, members identical or similar to those of the above described embodiment may not be described and instead the same reference signs as in the above described embodiment are given on the drawings.

The wafer jig 2y of this embodiment, as shown in FIG. 7, includes a light switching part 28 in place of the blocker 23 and the emitter 24 of the first embodiment.

The light switching part 28 is provided so as to project below the main body 21 of the wafer jig 2y. The light switching part 28 is located at the light path of the detection light of the mapping sensor 6 (the light path from the light emitting part 61 to the light receiving part 62).

The light switching part 28, for example, composed of a liquid crystal shutter, a mechanical shutter, etc. The light switching part 28 can switch the passage and blocking of the detection light of the mapping sensor 6.

The light switching part 28, for example, opens and closes according to the detection result of the object detection sensor 22, and appropriately switches whether the light receiving part 62 receives the detection light from the light emitting part 61 or not. Accordingly, the wafer jig 2y can output the information to the hand 10 as in the above described embodiment.

While the preferred embodiment and the variation embodiment of the present invention have been described above, the above configuration can be changed, for example, as follows.

The blocker 23 may be composed of a receiver (the jig light receiving part) having the same configuration as the light receiving portion 62. In this case, the controller 5 can give a command to the blocker 23 (that is, the wafer jigs 2, 2x) via the light emitting part 61. That is, the communication from the robot 1 to the wafer jig 2 may be realized without using an electrical cable. The command given to the wafer jig 2, 2x is arbitrary, and the command may include the start/stop of the detection by the object detection sensor 22, for example.

The blocker 23 may be omitted, and the emitter 24 may function as the blocker 23. In a configuration that can be controlled to turn off the light emitting part 61 when using the wafer jig 2, the blocker 23 is not required.

When viewed in the plan view (the thickness direction of the hand 10), the detection light from the light emitting part 22x and the light emitting part 22a are intersected. If the intersection is located at the center of the hand 10 (the wafer jig 2x), the light axis of the detection light do not have to intersect each other actually. For example, the light axis of the two object detection sensors 22 may be provided at different positions in the thickness direction of the main body 21x.

The two object detection sensors 22 included by the wafer jig 2x may be provided on the lower surface of the main body 21x as long as the object detection sensors do not interfere with the hand 10. If the light axis of the object detection sensor 22 can be arranged away downward from the main body 21x, the slit part 27 may be omitted.

The object detection sensor 22 may be a non-contact type sensor or a contact type sensor.

Instead of or in addition to the object detection sensor 22, various sensors may be provided in the wafer jig 2. For example, wafer jig 2 may include a non-contact type distance meter, and the emitter 24 may flash at a certain frequency according to the detected distance. There are a various ways of representing information by the control of the emitter 24. The lighting-on/lighting-off of the emitter 24 may be controlled according to a pattern in which information is represented by binary numbers. Instead of lighting-on/lighting-off of the emitter 24, it is also possible to represent the information by the intensity of light, the differences in the wavelength of the light source, etc.

The wafer jig 2, 2x, 2y may be used for purposes other than the detection of the object 9, 9x (in other words, the purpose other than the position correction of the robot 1).

The battery 26 may be configured as a primary battery or as a secondary battery. When the battery 26 is configured as a secondary battery, it is preferable that a charging device for charging the battery 26 is arranged in the storage position of the wafer jig 2 or another position. Thus, automatic charging can be realized.

The wafer jig 2, 2x, 2y can transmit the information to the controller 5 via other light sensors such as a load sensor provided on the hand 10 in place of the mapping sensor 6.

DESCRIPTION OF THE REFERENCE NUMERALS 1 robot
2, 2x, 2y wafer jig
5 controller (control part)
6 mapping sensor 9, 9x object
10 hand
22 object detection sensor (sensor)
23 blocker (blocking part)
24 emitter (light source)
61 light emitting part
62 light receiving part
100 robot system

The invention claimed is:

1. A wafer jig used for a robot having a hand including a light emitting part and a light receiving part for detecting detection light emitted from the light emitting part, the wafer jig comprising:
    a light source emitting notification light toward the light receiving part, wherein
    the wafer jig outputs information by emitting the notification light from the light source to the light receiving part.
2. The wafer jig according to claim 1, further comprising: a blocking part, wherein
    the blocking part blocks a light path between the light emitting part and the light receiving part when the wafer jig is held by the hand.
3. The wafer jig according to claim 1, further comprising: an object detection sensor detecting an object, wherein
    the light source outputs whether the object detection sensor detects the object as the information.
4. The wafer jig according to claim 3, wherein
    the object detection sensor is provided at a center of the wafer jig.
5. The wafer jig according to claim 3, wherein
    in a state where the wafer jig is held by the hand, the object detection sensor is located at a center of the hand.
6. The wafer jig according to claim 1, wherein
    the information is represented by a frequency of repeating of lighting-on and lighting-off of the notification light emitted by the light source or a frequency of repeating of a change of light intensity of the notification light.
7. The wafer jig according to claim 6, further comprising: a plurality of sensors, wherein
    the frequency is changed according to a combination of detection results of each of the sensors.
8. The wafer jig according to claim 7, wherein
    the plurality of sensors includes two light sensors,
    when viewed in a thickness direction of the wafer jig, a light axis of one light sensor intersects a light axis of the other light sensor,
    in a state where the wafer jig is held by the hand, an intersection of the light axes is located at the center of the hand when viewed in the thickness direction of the wafer jig.
9. The wafer jig according to claim 1, further comprising: a jig light receiving part capable of detecting light emitted from the light emitting part of the hand.
10. The wafer jig according to claim 9, wherein
    the jig light receiving part functions as a blocking part blocking a light path between the light emitting part and the light receiving part when the wafer jig is held by the hand.
11. A robot system comprising:
    the wafer jig according to claim 1;
    a robot capable of holding the wafer jig by the hand; and
    a control part controlling the robot by giving commands to the robot, wherein
    the control part receives information from the wafer jig side via the light receiving part.
12. A wafer jig used for a robot having a hand including a light emitting part and a light receiving part for detecting detection light emitted from the light emitting part, the wafer jig comprising:
    a jig light receiving part capable of detecting light emitted from the light emitting part of the hand, wherein
    the jig light receiving part is capable of receiving a command from the hand of the robot by the light emitted from the light emitting part.
13. A wafer jig used for a robot having a hand including a light emitting part and a light receiving part for detecting detection light emitted from the light emitting part, the wafer jig comprising:
    a switching part capable of switching between a state in which the light receiving part receives the detection light from the light emitting part and a state in which the light receiving part does not receive the detection light, wherein
    the wafer jig outputs information to the light receiving part by a switching of the switching part.
14. A communication method for transmitting information from a wafer jig to a robot, the robot having a hand including a light emitting part and a light receiving part detecting detection light emitted from the light emitting part, the wafer jig being capable of being held by the hand, the communication method comprising:
    a first step in which a state of keeping the wafer jig held by the hand is provided; and
    a second step in which a light source included in the wafer jig emits notification light corresponding to the information toward the light receiving part.
15. A robot teaching method by using the communication method according to claim 14, wherein
    a command position of the robot is corrected based on the information obtained from the wafer jig.
16. The wafer jig according to claim 12, wherein the jig light receiving part is comprised in a blocking part that blocks a light path between the light emitting part and the light receiving part when the wafer jig is held by the hand.
17. The wafer jig according to claim 12, further comprising:
    an object detection sensor detecting an object, wherein
    the object detection sensor comprises a light emitting part and a light receiving part that detect an object, and
    the command comprises a start/stop detection command to the object detection sensor.
18. The wafer jig according to claim 1, further comprising:
    a jig light receiving part capable of receiving a command from the hand of the robot by the light emitted from the light emitting part of the hand.
19. The wafer jig according to claim 1, wherein the light receiving part and the light emitting part are comprised in a sensor for detecting the presence or absence of a wafer supported in the robot hand.
20. The wafer jig according to claim 19, wherein the sensor comprises a mapping sensor.
21. The wafer jig according to claim 12, wherein
    the light receiving part and the light emitting part are comprised in a sensor for detecting the presence or absence of a wafer supported in the robot hand, and
    the sensor comprises a mapping sensor.

* * * * *